April 23, 1929.   S. ROMAN   1,710,515
SAFETY GAS VALVE
Filed Sept. 4, 1928
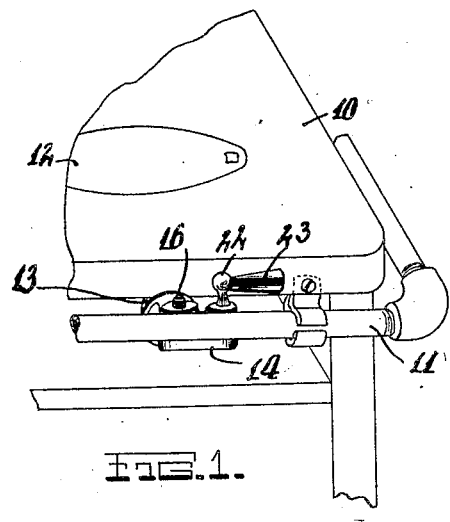
FIG. 1.
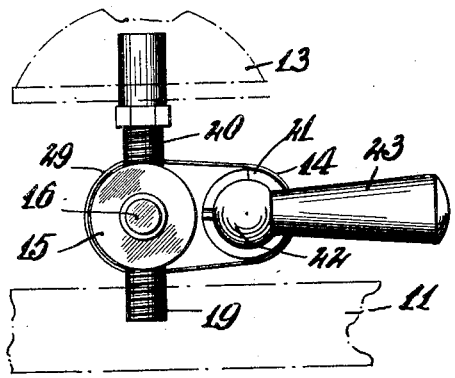
FIG. 2.
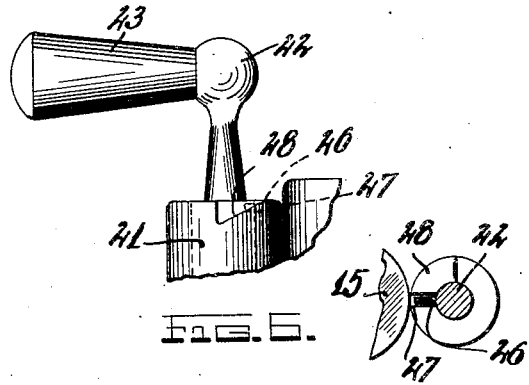
FIG. 6.
FIG. 5.
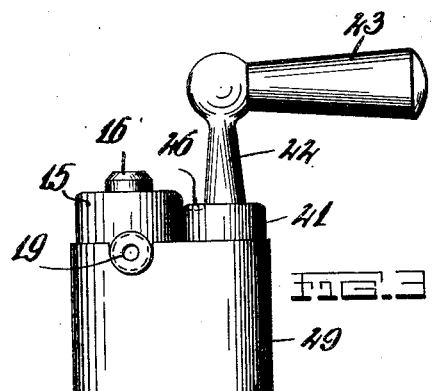
FIG. 3.
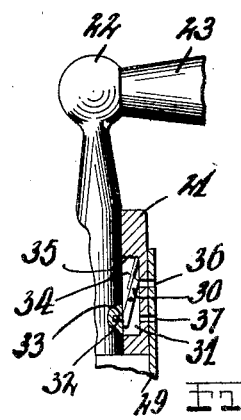
FIG. 7.
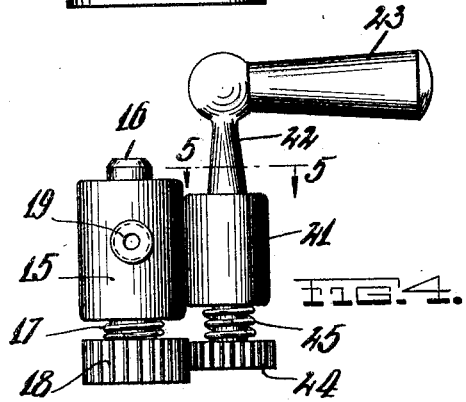
FIG. 4.
INVENTOR.
SIMON ROMAN
BY
ATTORNEY Patented Apr. 23, 1929.

1,710,515

UNITED STATES PATENT OFFICE.

SIMON ROMAN, OF NEW YORK, N. Y.

SAFETY GAS VALVE.

Application filed September 4, 1928. Serial No. 303,686.

This invention relates generally to valves and has more particular reference to a novel safety gas valve.

The invention has for an object the provision of a device of the class mentioned which is of simple durable construction, desirable in use and efficient in action, and which can be manufactured and sold at a reasonable cost.

The invention proposes the use of a valve body with a gas inlet and outlet connection and a rotatively mounted valve, and secured on this body, a stem body in which a stem is rotatively and slidably mounted. A handle is engaged on this stem and a spring normally urges the stem downwards for engaging a peg therefrom into a slot in the stem body. The valve and stem are connected by gears and the arrangement is such that the stem must be drawn up by the handle before the valve can be opened. It is pointed out that this arrangement prevents the asphyxiation of persons by gas by accidental opening of the valve. The ordinary gas valves may be opened by cats or dogs while persons are asleep.

For further comprehension of the invention, and of the object and advantages thereof, reference will be had to the following description and accompanying drawings, and to the appended claims in which the various novel features of the invention are more particularly set forth.

In the accompanying drawing forming a material part of this disclosure:—

Fig. 1 is a fragmentary perspective view of a gas range with one valve constructed according to this invention applied thereon.

Fig. 2 is a plan view of the valve per se.

Fig. 3 is a side elevational view thereof.

Fig. 4 is a similar view with a body cover thereof removed.

Fig. 5 is a fragmentary horizontal sectional view, taken on the line 5—5 of Fig. 4.

Fig. 6 is a fragmentary rear view of the device.

Fig. 7 is a fragmentary vertical sectional view of a modified form of the device.

The reference numeral 10 indicates generally a gas range of any design or construction having a gas supply pipe 11, and burners 12 provided with a connection pipe 13 intended to connect with a valve for operation thereof. A valve 14 is shown connected with the gas supply pipe 11 and with connection 13. In Fig. 2 the gas supply pipe and the connection 13 are shown in dot-dash line.

The safety valve 14 comprises a valve body 15 having a rotative valve 16 urged downwards upon its seat by reason of a spring 17 engaging against the bottom of the body 15 and against the top of a gear 18 attached onto the valve 16. The valve body has a gas inlet 19 and a gas outlet 20. A stem body 21 is secured onto the side of the body 15, or made integral therewith and has a stem 22 rotatively mounted therein and arranged for longitudinal sliding. A handle 23 is connected with the top end of the stem.

A gear 24 meshes with the gear 18 and is attached on the bottom of the stem 22 and a co-axial spring 25 on this stem acts between the gear 24 and the body 21 for normally urging the stem into a downward position. A pin 26 projects from the stem 22 and engages in a recess 27 in the top edge of the stem body 21. Adjoining this recess is a cam cut-out 28. The recess 27 and the cam cut-out 28 extend thru an angle of 90 degrees.

A cover member 29 engages over the lower portion of the bodies 15 and 21 for covering the gears 18 and 24. The handle 26 may be drawn up against the action of the spring 25 for moving the pin 26 from recess 27 but during this motion the gears 24 and 18 always mesh.

In operation of the device the handle 23 is first drawn upwards for moving the stem 22 up against the action of the spring 25 and then the handle is turned through an angle of 90 degrees for turning the stem and transmitting the motion to the valve 16 thru the agency of the gears for opening the valve. The gas is then free to flow from the inlet 19 to the outlet 20. The handle 23 may be turned back through the 90 degrees and the cam cut-out 28 forces the pin 26 to travel upwards and then fall into the recess 27 automatically holding the handle in locked position. Attention is called that a person cannot accidentally strike against the handle 23 for opening the valve. This is also true of animals accidentally moving against the handle.

In the modified form of the invention illustrated in Fig. 7, a bar 30 is shown pivotally mounted intermediate of its ends in a hollow 31 formed in the stem body 21. One end of the bar is provided with a projecting pin 32 engageable in an aperture 33 formed in the stem 22 for holding it against being drawn upwards. The top of the bar 30 is provided with a spring 34 engaging against a serrated top side 35 of the hollow 31 for holding the bar in whatever position it may be in. The casing 29 and the body 21 are formed with a pair of aligned apertures 36 and 37 communicating with the hollow 31 and disposed directly in line with the bar 30. A hair pin or other article may be inserted in the aperture 36 for forcing the spring held end of the bar 30 into a new position so that the pin end of the bar moves to free the pin from the aperture 33. Then the stem 22 may be operated as before stated. When desired, the same tool may be inserted through the aperture 37 for moving the pin end of the bar 30 into locking position again.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A device of the class described, comprising a valve body with an inlet and outlet connection, a rotative valve mounted therein and having a projecting bottom end, a gear fixed thereon, a stem body member connected with the valve body, a stem with a top handle, rotatively mounted in said member, and having a projecting bottom end, a gear fixed onto the stem and meshing with the said first mentioned gear, a spring for urging the stem downwards, and a pin projecting from the stem and engaging in a recess formed in the said stem body, the stem body being formed with a cam cut-out adjacent the said recess so that the stem may be manually raised to free the pin from the recess and then turned for opening the valve and allowing the pin to engage within said cam cut-out, said cam cut-out being arranged for guiding the pin into the recess upon a turning of the stem back to close the valve.

2. A device of the class described, comprising a valve body with an inlet and outlet connection, a rotative valve mounted therein, urged upon its seat by a spring and having a projecting bottom end, a gear fixed thereon, a stem body member connected with the valve body, a stem with a top handle, rotatively mounted in said member, and having a projecting bottom end, a gear fixed onto the stem and meshing with the said first-mentioned gear, a spring for urging the stem downwards, and a pin projecting from the stem and engaging in a recess formed in the said stem body, the stem body being formed with a cam cut-out adjacent the said recess so that the stem may be manually raised to free the pin from the recess and then turned for opening the valve and allowing the pin to engage within said cam cut-out, said cam cut-out being arranged for guiding the pin into the recess upon a turning of the stem back to close the valve.

3. A device of the class described, comprising a valve body with an inlet and outlet connection, a rotative valve mounted therein and having a projecting bottom end, a gear fixed thereon, a stem body member connected with the valve body, a stem with a top handle, rotatively mounted in said member, arranged for longitudinal sliding and having a projecting bottom end, a gear fixed onto the stem and meshing with the said first-mentioned gear, a spring for urging the stem downwards, and a pin projecting from the stem and engaging in a recess formed in the said stem body, the stem body being formed with a cam cut-out adjacent the said recess so that the stem may be manually raised to free the pin from the recess and then turned for opening the valve and allowing the pin to engage within said cam cut-out, said cam cut-out being arranged for guiding the pin into the recess upon a turning of the stem back to close the valve.

4. A device of the class described, comprising a valve body with an inlet and outlet connection, a rotative valve mounted therein and having a projecting bottom end, a gear fixed thereon, a stem body member connected with the valve body, a stem with a top handle, rotatively mounted in said member, and having a projecting bottom end, a gear fixed onto the stem and meshing with the said first-mentioned gear, a means for urging the stem downwards, and a pin projecting from the stem and engaging in a recess formed in the said stem body, the stem body being formed with a cam cut-out adjacent the said recess so that the stem may be manually raised to free the pin from the recess and then turned for opening the valve and allowing the pin to engage within said cam cut-out, said cam cut-out being arranged for guiding the pin into the recess upon a turning of the stem back to close the valve.

5. A device of the class described, comprising a valve body with an inlet and outlet connection, a rotative valve mounted therein and having a projecting bottom end, a gear fixed thereon, a stem body member connected with the valve body, a stem with a top handle, rotatively mounted in said member, and having a projecting bottom end, a gear fixed onto the stem and meshing with the said first-mentioned gear, a spring for urging the stem downwards, a pin projecting from the stem and engaging in a recess formed in the said stem body, the stem body being formed with a cam cut-out adjacent the said recess so that the stem may be manually raised to free the pin from the recess and then turned for opening the valve and allowing the pin to engage within said cam cut-out, said cam cut-out being arranged for guiding the pin into the recess upon a turning of the stem back to close the valve, and a means for locking the stem against longitudinal motion.

In testimony whereof I have affixed my signature.

SIMON ROMAN.